United States Patent [19]

Eccleston

[11] Patent Number: 4,744,018

[45] Date of Patent: May 10, 1988

[54] REGULATED POWER SUPPLY

[75] Inventor: Larry Eccleston, Marshall, Mich.

[73] Assignee: Progressive Dynamics, Inc., Marshall, Mich.

[21] Appl. No.: 912,626

[22] Filed: Sep. 29, 1986

[51] Int. Cl.$^4$ ............................................. H02M 3/335
[52] U.S. Cl. ........................................ 363/16; 363/97; 323/224
[58] Field of Search ................................ 363/16-17, 363/97-98; 323/224, 222; 318/760, 763, 56-57, 60, 63, 86

[56] References Cited

U.S. PATENT DOCUMENTS

| 3,559,029 | 1/1971 | Yarema | 363/16 |
| 4,075,546 | 2/1978 | Barber | 323/224 |
| 4,161,023 | 7/1979 | Goffeau | 323/224 |
| 4,349,776 | 9/1982 | Federico et al. | 323/224 X |
| 4,618,812 | 10/1986 | Kawakami | 323/224 |

OTHER PUBLICATIONS

"Power MOSFET Application and Product Data" HEXFET Databook, International Rectifier, 1981, pp. 36–39.

Primary Examiner—Peter S. Wong
Attorney, Agent, or Firm—Price, Heneveld, Cooper, DeWitt & Litton

[57] ABSTRACT

A voltage-agile, controlled output, regenerative-feedback power supply control circuit in which a power source is switched by a pair of controlled switch elements so as to supply a selective amount of output power to a load while also selectively completing a regenerative power feedback path, the switch elements preferably constituting FET switches of which a first is connected between the power source input and the circuit power output point and the second is connected between the circuit power output point and the circuit ground conductor. The gate terminals of the first and second FET switches are connected to receive generally opposite types of control signal representations of the level of circuit output power under load in relation to no-load output power.

14 Claims, 2 Drawing Sheets

REGULATED POWER SUPPLY

TECHNICAL FIELD

This invention relates to electrical power supplies and, somewhat more particularly, to switch-mode power supplies, in particular those power supplies whose output is a function of a pulse-form input whose effective pulse width may be selectively controlled to determine a duty cycle which establishes the value of the output on an average basis. In particular, the invention relates to a novel self-regulating switch-mode power supply whose output may be rapidly and extensively varied to meet rapidly-differing instantaneous requirements, i.e., of the "voltage-agile" type.

As one particular example of the use and application of power supplies in accordance herewith, reference is made to power source controls for electrically-powered wheelchairs, and the invention is described herein in conjunction with such an application as one preferred embodiment; however, it is to be expressly noted that numerous other applications are possible, and very desirable, for the power supply to be described, for any given situation generally analogous to the conditions exemplified by the preferred embodiment set forth below, from the standpoint of general circuit environment and performance requirements.

BACKGROUND

The "standard" or most basic type of control used heretofore for operating electrically-powered wheelchairs has merely comprised a manually-actuated polarity-reversing switch and resistive voltage divider, whether of the incrementally progressive (switched) type or of the continuously variable type (i.e., potentiometer, etc.). The polarity-reversing switch allowed the user to select "forward" or "reverse" movement direction, and the variable resistance component or network selectively changed the voltage effectively applied to the electric drive motor for the wheelchair, thereby changing the speed. Where the wheelchair equipped with such a control encountered a downhill slope, there was always a danger of runaway since the control itself had no built-in protection to prevent such results; that is, the only effective means of braking was to place the control in the "reverse" mode, whereby the forward movement of the vehicle resulting from gravitational forces is opposed by the applied opposite-polarity drive voltage.

Apart from its obvious disadvantages and limitations, the procedure just noted causes substantial power consumption and energy losses in the form of heat, and the control capability or function is inefficient and irregular, being essentially unregulated. Furthermore, the heat losses generated in the resistive components of the control and in the motor are detrimental to these elements and are likely to cause early failure. Many other disadvantages are also involved in such controls, including for example the absence of any assured constant speed at any particular control setting (including especially under the downhill conditions noted above) and arcing and sparking conditions in the control when switched from one polarity to the other, due to the mechanical switching utilized and the reactive components in the control and the motor, whose stored energy jumps across the switch contacts and causes detrimental local heating and burnout. Moreover, the possibility of motor and/or control burnout due to motor stall conditions was always present, since a handicapped person may not be able to avoid such a situation, e.g., one or both wheels may inadvertently become blocked by an obstacle or wedged into a fixed position where the control is set for continuing movement Improvements and variations on the above-described conventional type of control have been comparatively few and of comparative small magnitude, including for example the use of transistorized switches to reduce the arcing and sparking noted, together with the general concept of pulse-mode operation and pulse-width modulation as a control technique, which provides for more efficient operation as well as a more flexible type of control capability. Nonetheless, many serious problems and disadvantages of the general type discussed above remain present in the typical state-of-the-art controls presently in use.

Accordingly, the need for significantly improved controls having better and safer performance characteristics and increased efficiency has persisted for a considerable length of time. While this is particularly true in the wheelchair-control environment noted above, it is also true with respect to a number of other areas which, while perhaps functionally or operationally remote from the specific area of wheelchairs, nonetheless have very analogous electrical requirements, including for example, many typical switching regulator applications, in which the desired output is the average voltage determined by a selected duty cycle applied to a basic supply voltage.

BRIEF SUMMARY OF ADVANTAGES AND IMPROVEMENTS

The present invention provides a substantially improved power supply whose basic nature is that of a self-regulating switch-mode device, but whose configuration provides greatly improved operational flexibility and control capability, including constant-speed performance at any given control setting, dynamic motor braking, and substantially better efficiency due to the use of regenerative feedback which returns unused energy to the power supply rather than merely dissipating it as wasted heat energy. Further, these desirable results are obtained without the use of special sensing and switching components, and occur automatically, without operator participation. The power supply provided in accordance herewith has an output which is continuously and rigorously controlled, which is independent of load, and of load variations, whether rapid and volatile or gradual and continuous in nature. Due to the greatly enhanced efficiency, and the commensurate reduction in the amount of heat produced, economic advantages are provided from the standpoint of componentry and construction, inasmuch as the need for heat-sinks and heat-dissipating structure previously deemed essential is now completely eliminated; at the same time, basic components such as the drive motor, etc., are ensured longer operational lifetimes, the amount of required repair and reconstruction being substantially diminished.

BRIEF SUMMARY OF INVENTION

Briefly stated, control apparatus in accordance with the invention provides a novel circuitry arrangement in the general nature of a compound switch-mode regulator, comprising, in effect, a combined bucking-type and flyback-type switching regulator, which includes a pair of complementary, commonly-connected, oppositely-operating switching circuit branches. The first such branch comprises a compound, double-acting network which applies a selected average level of drive voltage to the device being controlled (e.g., the electric motor for a wheelchair, or other such electromagnetic apparatus), while simultaneously making available a flyback path for regenerative feedback to the system power source at any time the magnitude of any regenerative voltage exceeds the set point of the selected drive voltage level, all on a substantially automatic basis, without the requirement of any special sensing components and with the commensurate operating efficiencies resulting from coupling of the regenerative voltages back to the source rather than wasting the same in the useless creation of heat energy. The novel circuitry in accordance with the invention optimizes efficiency through the elimination of energy storage at semiconductor junctions, e.g., across diodes, and uses built-in sensing capabilities to compare a control voltage with a no-load operating voltage reference, provided by a second circuit branch, so as to effect commensurate accurate and continuous unvarying control.

In a more particular sense, a preferred control apparatus in accordance with the invention comprises a first pair of direct-coupled Field Effect Transistors ("FETs") which are connected in circuit for opposite-polarity pulse-mode actuation, and a second pair of direct-coupled FETs connected across the first pair but driven oppositely with respect thereto (180 degrees out of phase). The first such pair is used as the current-carrying instrumentality which supplies the load, and the second such pair is used as a control means, to provide a complementary voltage sense. This sensed value is compared to a reference level and fed back differentially to the circuit input, such that a selected operating level is maintained on a constant, continuing basis notwithstanding changes at the load.

DESCRIPTION OF CONVENTIONAL TECHNOLOGY

Figure 1:
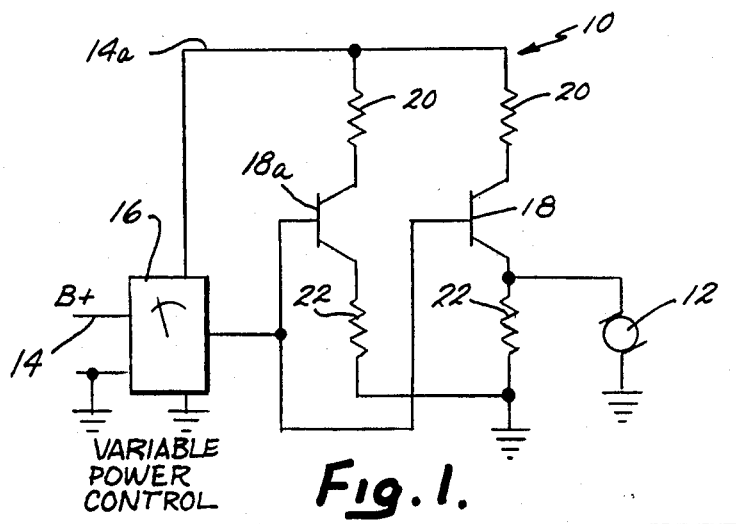
FIG. 1 is an electrical schematic depicting a standard prior art power supply control circuit.

The circuit 10 illustrated in FIG. 1 is representative of a typical known type of power supply, which may be switch-mode or otherwise, used to control a motor or other such load 12 from a battery or other B+ source 14, in accordance with the setting of a manually-variable or other selectable control apparatus 16, shown as being connected to both the plus and minus side of the supply voltage. Basically, such a circuit merely comprises one or more switching devices (here, power transistors 18, 18a) which are connected in tandem between the B+ source 14 and the load 12 to provide a reversible and variable-level energizing path therebetween in accordance with the setting of control 16 and as determined by level-setting resistors 20 and 22.

Where the power supply device is to be operated in a switching mode, the control 16 will include a pulse control, e.g., a chopper, and a level selector, capable of supplying actuating pulses of variable width and polarity to switch the transistors 18, 18a on and off at the rate required to establish a selected duty cycle, in accordance with which the motor 12 operates at a selected speed. As may be appreciated, control 10 provides bi-directional capability through manipulation of control 16, by which the applied operating voltage may be reversed in polarity, to reverse operation of the motor 12.

In such a control, the operating speed will vary in a substantially direct manner with the nature and magnitude of the applied load, and under conditions where an active load of substantially greater magnitude than that typically to be expected is in fact encountered (e.g., in an electrically-powered wheelchair, wherever a downhill slope is encountered) runaway motion can only be effectively countered by commanding reverse excitation of the motor, in which event substantial energy is lost through heat generation in the control components and in the motor itself.

Figure 2:
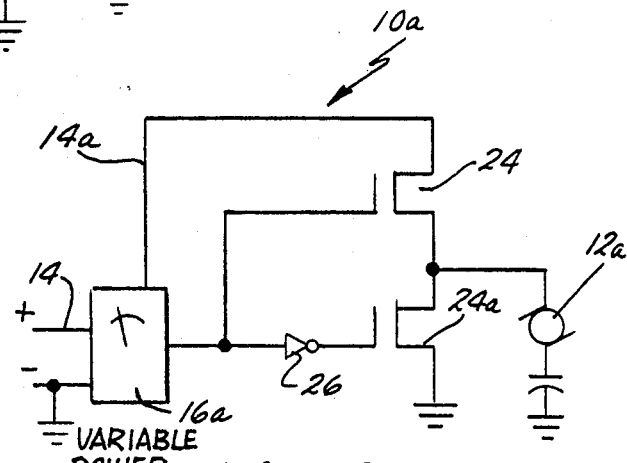
FIG. 2 is an electrical schematic diagram illustrating an improved state-of-the-art power supply control.

The circuit 10a of FIG. 2 is basically similar to that of FIG. 1, but the power transistors 18, 18a have been replaced by direct-coupled FETs 24, 24a, which are operated in an inverse manner due to the inclusion of an inverter 26 connected between the control 16a and the control gate of FET 24a.

Figure 3:
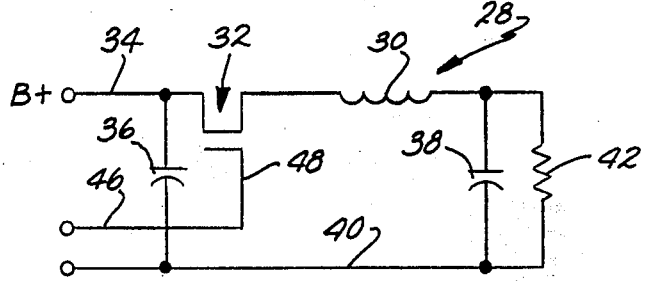
FIG. 3 is an electrical schematic diagram illustrating a typical known type of bucking regulator.

The circuit 28 depicted in FIG. 3 constitutes a very basic conventionally-known form of a bucking-type switch-mode voltage regulator, which includes an inductor 30 connected in series with a FET 32 or other such switching component in the B+ supply line 34. In such a circuit, an input filter capacitor 36 is typically employed, and there is usually an integrating capacitor 38 which is connected between the output side of inductor 30 and ground potential, appearing on conductor 40. An output resistor 42 is connected across integrating capacitor 38, and a flyback diode 44 is usually included, by which current flow may continue through the inductor 30 and the load during those intervals when the drive is removed from the load, i.e., when the series switch (e.g., FET 32) is opened by the absence of control pulses on an input conductor 46 connected to the gate 48 of FET 32. Thus, the average current flow through the inductor 30 determines the resultant load excitation.

Figure 4:
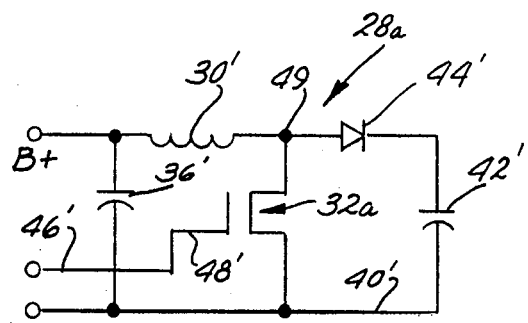
FIG. 4 is an electrical schematic diagram illustrating a typical known type of flyback-mode regulator.

The regulator circuit 28a shown in FIG. 4 has certain evident similarities to that shown in FIG. 3, a principal difference being that the control element (e.g. the FET switch 32a) is connected between the inductor 30' and the ground conductor 40', rather than being in series with the inductor. Also in effect reversed is the position of the diode 44', which is connected in series between the inductor 30' and an output capacitor 42'. Thus, in this type of regulator or supply circuit, when the control switch 32a is closed by an appropriate pulse applied to the control gate 48' along input conductor 46', the connection point 49 is momentarily lowered in potential and current flow builds up through the inductor 30'. At the same time, output capacitor 42' discharges back through flyback diode 44' to the low potential point 49, and through the closed FET switch 32a to ground. When switch 32a once again opens and circuit point 49 rises in potential, the reverse occurs, with output capacitor 42' once again charging back up to its normal higher potential, as a function of the circuit time constant.

DESCRIPTION OF PREFERRED EMBODIMENTS

As indicated above, apparatus in accordance with the invention may be considered to comprise a novel integration or combination of a bucking-type switch-mode regulator and a flyback-type switch mode-regulator, such as are noted above in connection with FIGS. 3 and 4. Thus, the circuit described hereinafter as a preferred embodiment of the invention has, in essence, two directions or modes of operation, in a first of which circuit performance is analogous to that exemplified by a bucking-type regulator, and in the second of which analogous to that exemplified by a flyback-type regulator. In continuous running operation, the result provided is a high degree of voltage output control, in which the output voltage is not dependent upon the load, unlike the conditions prevailing in conventional supply circuits such as those illustrated in FIGS. 1 and 2.

Figure 5:
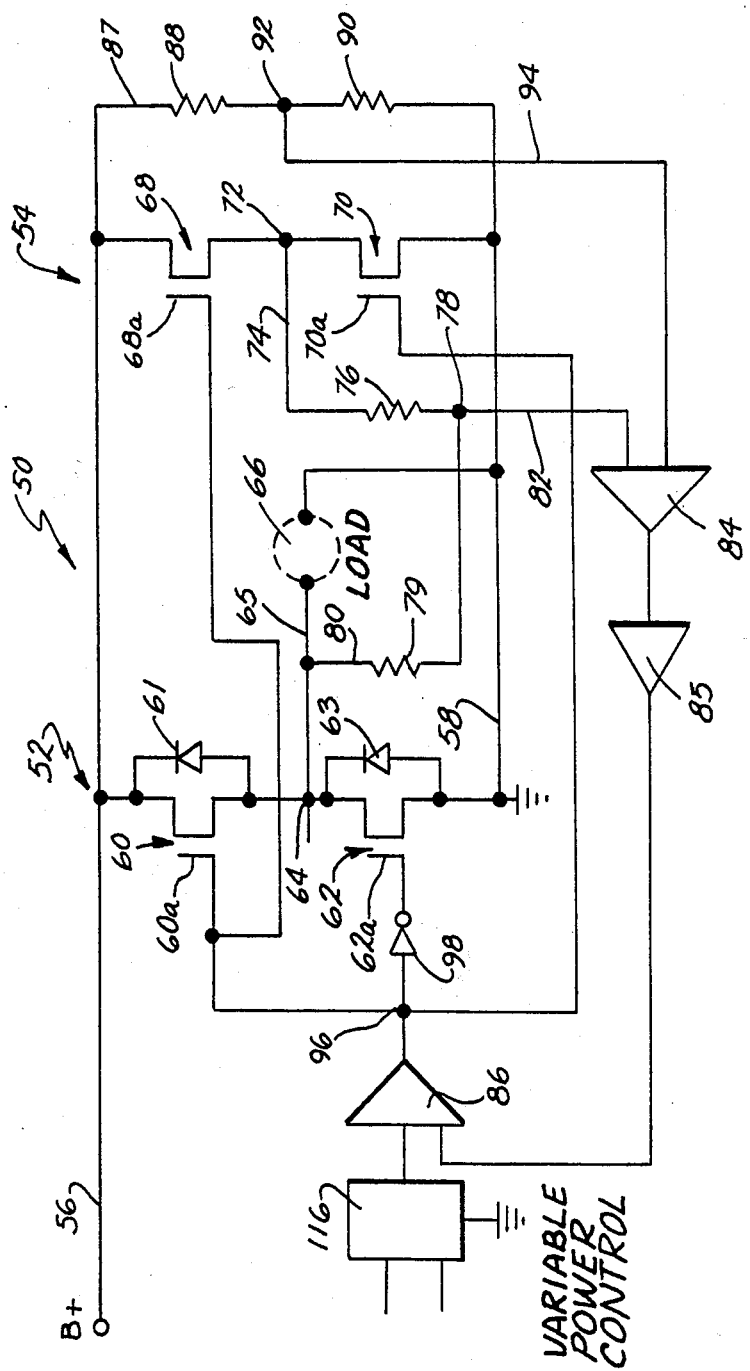
FIG. 5 is an electrical schematic diagram illustrating the novel regulated supply in accordance herewith.

One particular preferred embodiment of a control in accordance with the invention is illustrated in FIG. 5. As seen there, the apparatus 50 includes a pair of FET switching branches 52 and 54, each of which is connected between the B+ supply line 56 and the system ground 58. FET branch 52 includes a pair of directly-connected power FETs 60 and 62, whose common junction point 64 is connected to a load 66 and provides the effective drive excitation for the same. The load 66 may be considered, for purposes of illustration, to be a wheelchair drive motor analogous to the motors 12, 12a discussed above in connection with FIGS. 1 and 2; however, as will be readily understood, in the broader connotations of the invention the load 66 could be any of a number of different particular devices, typically of an electromagnetic character but not necessarily so.

Each of the power FETs 60, 62 is shown as having a diode 61, 63, respectively, connected across it in opposite conductive polarity to that represented by the B+ line 56. Preferably, diodes 61 and 63 are internal to the FETs themselves, i.e., a diode action provided by the multiple-layer construction of the Field Effect Transistors. Such an effect is provided, for example, in the power FETs (MOSFETs) sold by Siemens which are designated their type BUZ 10H, which provides desirable operating characteristics for the electrical wheelchair application indicated (as well as other such applications). In the wheelchair application described, a typical drive motor for use as load 66 may be a twelve-volt, seven to ten amp (operating current) d.c. motor, or a comparable twenty-four volt (four to five amp operating current) motor such as that sold by Motor Products Of Owosso of Owosso, Mich.) and designated as their model JAS 15C. As will be understood, the particular power FETs selected for use should have operating characteristics (such as their conducting resistance and maximum current-carrying capability) matched to the particular motor selected.

The second FET circuit branch 54 is configured somewhat similar to branch 52, discussed above, including a pair of directly-connected FETs 68 and 70; unlike FETs 60 and 62, however, FETs 68 and 70 need not be high-power devices, since their function is to provide a control voltage sense (as discussed below); consequently, FETs 68 and 70 may be low-power devices, and need not have an internal diode feature as discussed above. An example of a particular FET which may be used to implement FETs 68 and 70 is the Siliconix VN 10 KM.

As illustrated, the common junction 72 of FETs 68 and 70 is connected along a path 74 and through resistor 76 to a circuit junction point 78, and this point is also connected, along a circuit branch 80, to the aforementioned drive point 64 for FETs 60 and 62. Consequently, it will be observed that the two midpoints 64 and 72 of FET circuit branches 52 and 54 are in effect balanced against one another at circuit point 78, and this point is coupled along a circuit path 82 to one input of a comparator 84, whose output is in turn coupled back through an "op amp" 85 to the circuit input, in a manner to be described subsequently. The other input of comparator 84 is derived from a resistive voltage divider branch 87 connected across the two FET circuit branches 52 and 54, between B+ line 56 and ground 58. Voltage divider branch 87 includes a pair of complementary resistors 88, 90, whose relative proportions determine the value of a reference voltage appearing at their common connection point 92. This reference voltage is coupled as a second input to comparator 84 along a circuit path 94, as illustrated.

The control gate 68a of low-power FET 68 is coupled back to the control gate 60a of power FET 60, and the control gate 70a of low-power FET 70 is coupled back to this same input signal condition, which is present at input junction point 96. The input control gate 62a of power FET 62 receives an opposite-polarity version of the input signal initially present at circuit point 96, the initial input being inverted by an inverter 98. Thus, it will be apparent that power FETs 60 and 62 operate in a directly opposite manner with respect to one another, and that sensing circuit branch 54 functions in a manner which is in effect the opposite of that attributable to FET circuit branch 52. Both such oppositely-varying signals are combined at the circuit nodal point 78, and applied to one input of comparator 84.

The control signal initially provided to circuit 50 as an input emanates from a control device 116, to which a positive-polarity input supply is connected. As will be understood, such a control unit should have a manually operable member such as a push switch or slide switch (or "joy stick," etc.) by which the operator can readily change speed and operational direction, such changes being brought about by changes in the effective pulse width outputted from the device, by which one may change the duty cycle applied to the drive motor 66. The output pulses from control 116 are balanced against (differentially combined with) the integrated output of comparator 84, which is coupled back through an integrator 85 as an input to a differential amplifier designated 86, to whose other input the control 116 is also coupled.

In a switch-mode device such as that under discussion, the control unit 116 will be a variable pulse generator, which may be manipulated by the wheelchair operator to control the speed and direction (i.e., forward or reverse) desired for the wheelchair under any given condition. Such a device, for example, may be implemented by using a typical commercially-available separate-component pulse generator and pulse-width modulator, or a special-purpose hybrid variable pulse-width controller device, which is also available as a standardized commercial component. As a very basic example of the control 116, a single-frequency chopper may be used to produce a triangular waveform and an output level-select control determines the zero-point of the triangular wave, by which the period or width of the repetitive triangular pulse is determined.

Typically, a pulse-type controller such as that referred to above is operated at a comparatively low frequency (e.g., 80 Hz), but it is more preferred, in accordance with this invention, to operate at a much higher frequency (e.g., 25 kHz), which provides for inaudible operation as well as for increased control capability. In using such higher frequencies, the above-noted MOSFET switches are particularly desirable for use since they are high-speed devices which ensure full half-cycle conduction without overlap (simultaneous conduction) between the conduction periods of the respective circuit portions. To further enhance such high-frequency operation, a fast-acting (high-speed) FET driver may be used as an interface device between the pulse-width modulator and the FET gates, for example a Unitrode (UC) 3707 device.

In accordance with the foregoing, it may be seen that as input pulses emanating initially from controller 116 are applied to the control electrodes of the respective FETs in circuit branches 52 and 54, as for example to apply a forward excitation to the drive motor or other load 66, the pulsing command signal from the controller functions to set a duty cycle and thus apply a desired drive voltage to the load which constitutes a proportional part of the B+ voltage carried on conductor 56. For purposes of illustration, it may be considered that during such forward-direction commands FET 60 will be driven into and out of conduction at the pulse repetition rate produced by the controller, whereas FET 62 will be receiving opposite-polarity control voltage and will thus be non-conductive during such time. FETs 60 and 62 operate in an opposite manner; thus when reverse or opposite-direction motion is commanded, the opposite polarity and opposite FET conduction characteristic will prevail, resulting in circuit nodal point 64 receiving opposite-polarity control voltage, causing current flow through load 66 to be in the opposite direction under such conditions.

The drive actuation voltage appearing at circuit nodal point 64 is also applied, through conductors 80 and 79, to node 78, where it is balanced against the voltage present at the common junction 72 of FETs 68 and 70 (which represents the no-load voltage). This composite sense voltage is compared with the selected resistively-determined reference voltage which is present at nodal point 72. By so doing, the power supply apparatus 30 actually regulates the operative output voltage appearing across load 66, rather than merely applying a predetermined excitation thereto on an open-loop basis. In effect, the control voltage at node 78 is an ongoing and instantaneous representation of actual load excitation compared to no-load excitation; in fact, under actual no-load conditions, the excitation present at node 78 will be one-half that of the applied voltage from conductor 76 because each point in time when FET 60 is driven into conduction and nodal point 64 goes positive, circuit branch 74 is also driven into conduction, but through both FETs 68 and 70. By comparing the actual voltage present at circuit node 78 with that present at circuit junction 72, which is resistively divided by resistors 68 and 70, an error signal is obtained which is a direct function of the voltage drop across the load 66. Thus, if the load is drawing heavy current, a comparatively higher voltage will appear at circuit point 78, in relation to the resistively-divided voltage present at circuit point 72.

Accordingly, the disclosed power supply circuitry operates to establish an output voltage, or working voltage, independently of load conditions, contrary to conventional supplies which are very substantially load-dependent. In an "idle" condition, without loading of the motor or other controlled device, the current flow through the motor or equivalent inductance will rise and fall symmetrically about zero if the motor or other load device is drawing no average current. If an operating mode is set by actuation of controller 116, current flow through the motor (or other equivalent load) will alternately rise and partially discharge, to maintain the set voltage, and it will do so even if there is no load applied to the motor. Thus, the particular operation achieved by setting a given duty cycle, by manipulation of the controller, is not changed to any significant degree by conditions actually encountered or presented through the load, e.g., load variations, pulsations, etc.

In the illustrative example of an electric wheelchair drive motor control, the advantages of such an apparatus will be immediately clear; that is, the operator selects a set speed by actuation of the controller, and that speed is very closely maintained even though the terrain being traversed may vary in its surface characteristics, angle of inclination, etc. Should the wheelchair encounter a downward slope of significant gradient, the motor will be driven by gravitational effects to produce back EMF, which will be constructively used; i.e., as regenerative feedback, returning power to the supply rather than dissipating it in the form of lost heat energy, etc., and dynamic braking also will occur inasmuch as point 84, representative of the input to the load, will be connected to ground through a very small resistance, (i.e. the conducting resistance of FET 62), and this all occurs without the requirement for any special sensing and/or switching.

It may thus be seen that the present invention provides very extensive control functions for maintaining particularly selected applied voltages, in some respects resembling switch-mode regulator circuitry and performance characteristics and to some extent resembling a combination of both a bucking-type regulator and a flyback regulator, running continuously and in an integrated, mutually cooperative manner providing for extensive control of operating (load) voltages. Of course, it is to be understood that the desirable applications for such a device are extensive and diverse, including numerous specific uses in addition to the electrical wheelchair apparatus discussed above as an illustrative example, particularly where the load to be controlled characteristically involves significant and comparatively randomized variations and pulsations. In the electric wheelchair example, however, it is to be noted that the apparatus of the invention provides all of the desired control characteristics, including careful and continuous speed control, dynamic braking, and regenerative feedback, with commensurate operational efficiency, while involving only a relatively simple circuit with comparatively few components. At the same time, the safety margin is extensive, since component overload and burnout is essentially eliminated, including in particular the motor being controlled as well as the control itself.

It is to be expected that other applications for the disclosed apparatus will likely involve analogous advantages and safety factors, the range of likely application including practically all circumstances where voltag agile power supplies are desirable; in fact, the apparatus provided herewith could well serve the purpose of a standard power function generator. That is, depending upon the control signal used as the initial input, various waveforms could be generated for any given purpose, with characteristic close control, essentially no overshoot, and with very agile voltage output-variation capabilities.

The above description is that of a preferred embodiment of the invention. Various changes and alterations can be made without departing from the spirit and broader aspects of the invention as set forth in the appended claims, which are to be interpreted in accordance with the principles of patent law, including the doctrine of equivalents.

The embodiments of the invention in which an exclusive property or privilege is claimed are defined as follows:

1. A voltage-agile, controlled output, regenerative feedback power supply control circuit, comprising in combination: a power source input; a circuit ground conductor; a first controllable switch means connected between said power source input and a power output point for said circuit, for supplying a selective amount of output power to a load connected to said output point; and a second controllable switch means connected between said circuit output point and said circuit ground conductor, for selectively completing a regenerative power feedback path when switched to a conductive condition; said first and second controllable switch means each having a control terminal for receiving control signals operative to selectively change the conduction state of the associated switch means; output control means for producing control signals of variable effective magnitude and thereby selectively varying the circuit power output; circuit means for operatively connecting said control terminals of said first and second switch means to said output control means in a manner to apply mutually different representations of said control signals to said first and second switch means respectively such that the latter operate separately and under different conditions, a first such condition providing circuit output power excitation to a load connected to said output point and a second such condition providing regenerative power feedback to said power source input; and circuit means for comparing the power output actually supplied by said first controllable switch means to circuit power output under no-load conditions, and for changing said control signal as a function of said comparison to compensate for actual load conditions by controlling said circuit output power accordingly.

2. A power supply control circuit according to claim 1, including a polarity-responsive switch means coupled across each of said first and second controllable switch means in opposite conductivity direction.

3. A power supply control circuit according to claim 1, and including a pair of switch means connected serially to one another to provide a circuit branch which is connected across said power source input and the circuit ground, said pair of switch means having a common connection point and said connection point being coupled to said means for comparing.

4. A power supply control circuit according to claim 3, wherein said pair of switch means has a pair of control input terminals and such terminals are connected for generally opposite control actuation with respect to the control inputs of at least one of said first and second controllable switch means.

5. A power supply control circuit according to claim 4, and including a voltage-divider network connected across said power source input and said circuit ground, said network including a connection point of selectively reduced voltage from that of said power source; and circuit means for coupling said connection point to said means for comparing, such that the latter operates to compare said selectively reduced voltage with a representation of the circuit power output providing load excitation.

6. A power supply control circuit according to claim 5, and including an integrator means coupled between said means for comparing, and said output control means for summing the output from the said means for comparing over a predetermined time-constant prior to applying such signals to said input control means.

7. A power supply control circuit according to claim 1, wherein said controllable switch means comprise Field Effect Transistors.

8. A power supply control circuit according to claim 2, wherein said controllable switch means comprise Field Effect Transistors and said polarity-responsive switch means comprise integral parts of said Field Effect Transistors.

9. A power supply control circuit according to claim 1, wherein said control signal produced by said output control means comprises a pulsing signal of variable effective duty cycle.

10. A regenerative feedback power supply control circuit for electric motor-driven wheelchairs and other reactive loads, comprising in combination: a power source input; a circuit group condutor; control means for producing control signals of variable effective duty cycle and applying such signals to selectively establish a desired circuit power output level; a first power FET switch connected between said power source input and a circuit power output point at which a load is connectable, for supplying a selective level of output power to such a load as a function of the effective duty cycle of said control signals; a second power FET switch operably connected between said circuit output point and said circuit ground conductor, for selectively completing a regenerative feedback path when switched to a conductive condition; said first and second power FET switches each having a gate terminal for receiving representations of said control signals, to separately and selectively change each such switch between the states of being conductive and non-conductive; circuit conductor means for operatively connecting said gate terminals of said first and second FET switches to said control means in a manner to apply generally opposite types of representations of said control signals to the respective said gate terminals such that said first and second FET switches are made conductive under generally opposite conditions, a first such condition providing circuit output power excitation through said first power FET switch to a load connected to said output point and a second such condition providing regenerative feedback through said second power FET switch back to the power source; a second circuit branch connected across said power source input and the circuit ground, said second circuit branch comprising a pair of series-connected controllable switch means; said controllable switch means in said pair each having a control terminal for receiving a control signal operative to change the state of conduction of the associated switch means; circuit conductor means connecting said controllable switch menas control terminals to receive representations of said control signals of a character which causes said controllable switch means to operate in a generally opposite mode to the selective operation of said second power FET switch, said series-connected controllable switch means having a common connection point providing a compensating voltage signal; and circuit means connecting said common connection point to the common junction of said power FET switches and back to said control means as a feedback signal, such that said feedback signal comprises a composite representation of the level of the circuit power output present at said circuit output point and the said compensating voltage signal from the common connection point of said controllable switch means.

11. A power supply control circuit according to claim 10, including a voltage-proportioning circuit branch connected across said power source input and the circuit ground to produce a reference signal representative of no-load circuit output, and comparison means for receiving said reference signal and said composite feedback signal and combining both such signals into a final feedback signal applied to said control means.

12. In a voltage-agile, controlled output, regenerative feedback power supply control circuit for electric motor-driven wheelchairs and other reactive loads, of the type having control means for producing a variable control signal and applying such signal to selectively establish a desired circuit power output level a controllable switch means connected between a power source input and a power output point, for supplying a selective level of output power to a load connected to said output point as a function of said control signal, a second switch means connected between said circuit output point and the circuit ground for completing a regenerative feedback path when switched to a conductive condition, and means for operatively controlling said first and second switch means in a manner such that said first and second switch means are conductive under generally opposite conditions, a first such condition providing circuit output power excitation to a load connected to said output point and a second such condition providing regenerative feedback from said load to the power source, the improvement comprising: circuit means for deriving a feedback signal which is representative of load versus no-load circuit power output conditions, and feeding such signal back to said control means; and said control means being responsive to said feedback signal to change said variable control signal to thereby change said circuit power output level accordingly.

13. The improvement in a power supply control circuit according to claim 12, wherein said circuit means for deriving said feedback signal is structured to operate in a generally continuous manner such that said feedback signal is substantially continuously representative of load versus no-load circuit power output conditions.

14. In an electric motor-driven wheelchair having a voltage-agile, controlled output, regenerative feedback power supply, the improvement comprising: said power supply includes a bucking-type regulator circuit and a flyback-type regulator circuit, and control circuit means for controlling both such regulator circuits with opposite-polarity control signals, such that under a first load condition established by operating parameters of said motor, the power supply output is determined by the bucking-type regulator circuit controlled by said control signals having one polarity and under a second load condition established by said motor, the power supply output is determined by the flyback-type regulator circuit controlled by said control signals having an opposite polarity from said one polarity.

* * * * *

UNITED STATES PATENT AND TRADEMARK OFFICE
CERTIFICATE OF CORRECTION

PATENT NO. : 4,744,018

DATED : May 10, 1988

INVENTOR(S) : Larry Eccleston

It is certified that error appears in the above-identified patent and that said Letters Patent is hereby corrected as shown below:

Column 10, Claim 10, Line 33:
  "group" should be -- ground --.

Signed and Sealed this

Twenty-ninth Day of November, 1988

Attest:

DONALD J. QUIGG

*Attesting Officer*                *Commissioner of Patents and Trademarks*